(12) United States Patent
McGill

(10) Patent No.: US 6,866,163 B2
(45) Date of Patent: Mar. 15, 2005

(54) DISPENSING APPARATUS

(75) Inventor: Shane R. McGill, West Malling (GB)

(73) Assignee: McGill Technology Limited, West Malling (GB)

( * ) Notice: Subject to any disclaimer, the term of this patent is extended or adjusted under 35 U.S.C. 154(b) by 262 days.

(21) Appl. No.: 10/203,217

(22) PCT Filed: Feb. 5, 2001

(86) PCT No.: PCT/GB01/00450
§ 371 (c)(1),
(2), (4) Date: Aug. 7, 2002

(87) PCT Pub. No.: WO01/60173
PCT Pub. Date: Aug. 23, 2001

(65) Prior Publication Data
US 2003/0071054 A1 Apr. 17, 2003

(30) Foreign Application Priority Data
Feb. 19, 2000 (GB) .............................. 0003820

(51) Int. Cl.⁷ ................................................. B67D 5/08
(52) U.S. Cl. ...................... 222/63; 222/95; 222/103; 222/309; 222/333; 222/326; 222/386; 222/409
(58) Field of Search ............................ 222/63, 103, 95, 222/309, 185.1, 325, 326, 23, 333, 409, 386

(56) References Cited

U.S. PATENT DOCUMENTS

| | | | |
|---|---|---|---|
| 3,832,886 A | | 9/1974 | Pliskin |
| 4,193,753 A | | 3/1980 | Yoshioka |
| 5,069,364 A | * | 12/1991 | McGill ........................ 222/95 |
| 5,232,027 A | * | 8/1993 | Tanaka et al. .............. 141/270 |
| 5,271,528 A | * | 12/1993 | Chien .......................... 222/63 |
| 5,494,194 A | | 2/1996 | Topper et al. |
| 5,505,336 A | * | 4/1996 | Montgomery et al. ........ 222/82 |
| 5,816,455 A | | 10/1998 | Alpers et al. |
| 5,918,767 A | | 7/1999 | McGill |
| 6,264,066 B1 | * | 7/2001 | Vincent et al. ............... 222/95 |
| 6,325,244 B2 | * | 12/2001 | Vincent et al. ................ 222/1 |

FOREIGN PATENT DOCUMENTS

| | | |
|---|---|---|
| GB | 681 197 | 10/1952 |
| WO | WO 97/42096 | 11/1997 |

* cited by examiner

Primary Examiner—Michael Mar
Assistant Examiner—Patrick Buechner
(74) Attorney, Agent, or Firm—Nixon & Vanderhye P.C.

(57) ABSTRACT

Dispensing apparatus is provided for dispensing viscous product from containers (10) of product, usually by extruding product from a container outlet. Product is discharged by a plunger (13) which causes product to be discharged and the plunger is operated by a drive arrangement having a linear actuator (15) by which the plunger is moveable. The linear actuator uses an electric motor as the prime mover and the motor's rotary motion is converted into a linear motion of the plunger. By the use of a linear drive it is possible to achieve constant velocity of movement of the plunger independent of the resistance to movement, within the predetermined limits. The movement of the plunger can be controlled according to the resistance encountered. The apparatus also includes means for removing containers from their seating after discharge.

13 Claims, 8 Drawing Sheets

Figures 1A, 1B, 1C:
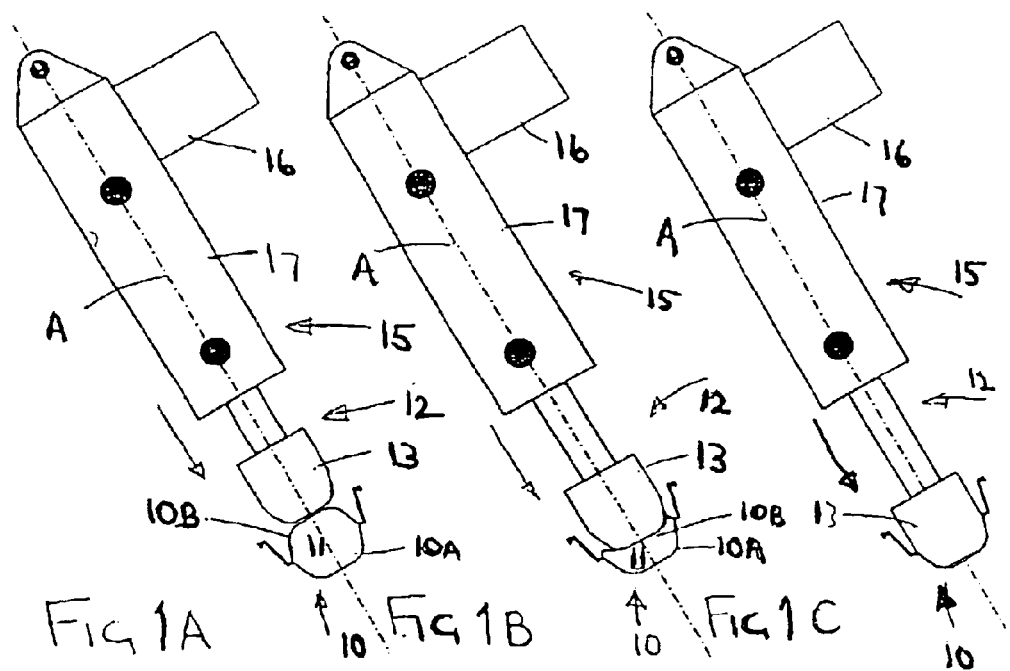

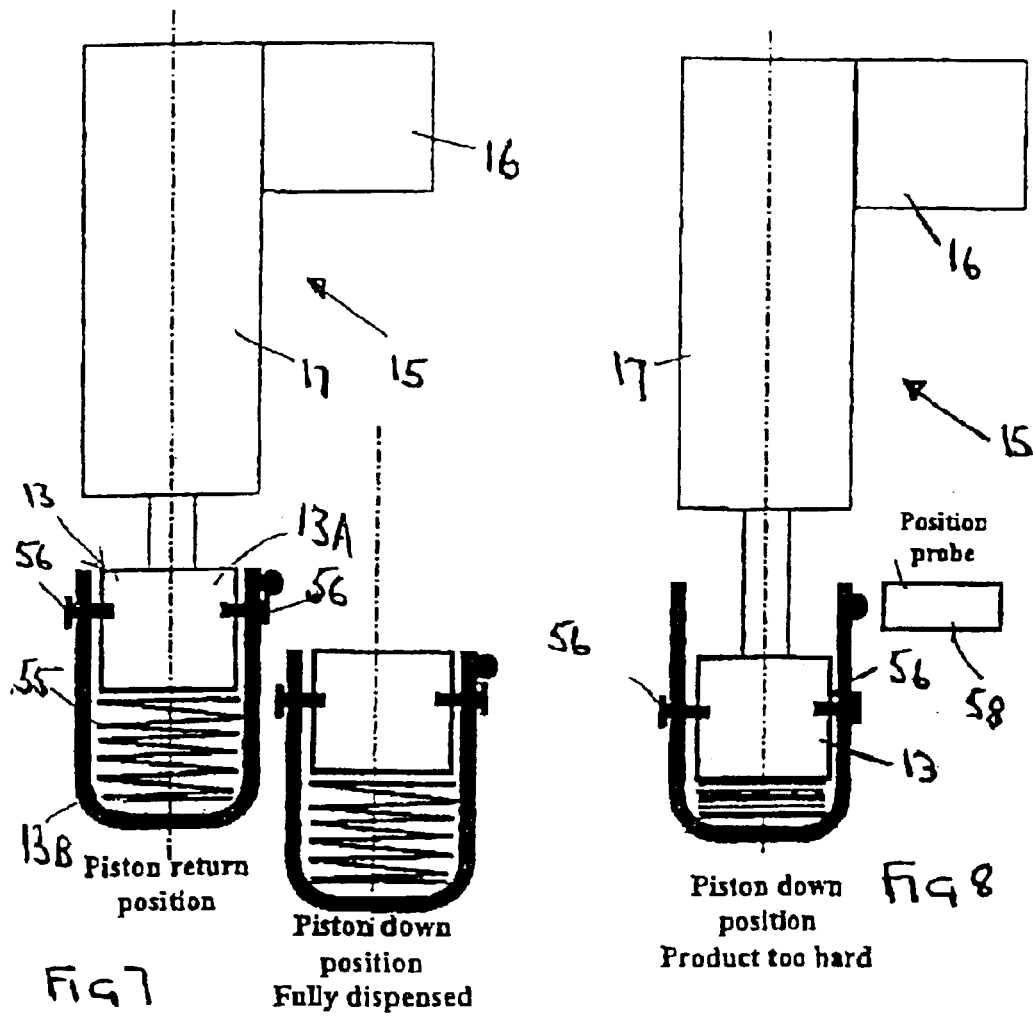
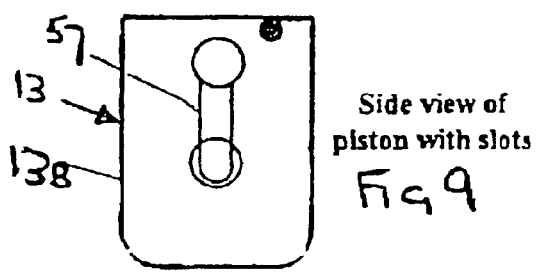

EMPTY CONTAINER DISCHARGE

DISPENSING APPARATUS

This application is the US national phase of international application PCT/GB01/00450 filed 5 Feb. 2001 which designated the U.S.

This invention relates to dispensing apparatus for dispensing viscous product from a container of product.

It has been proposed to dispense product, such as frozen dessert, from pre-filled containers of product by extruding the product through a relatively small opening in the container.

Hitherto the drive for discharge has usually been pneumatically powered and this has given rise to limitations in the discharge especially when the product is of varying viscosity as they do not discharge a constant volume of product per unit time.

An object of the invention is to provide improved dispensing apparatus for extruding product.

According to one aspect of the invention dispensing apparatus for dispensing viscous product from a container of product, comprises drive means, a plunger operated by the drive means to move reciprocally in a dispensing and a return direction, a support for the container locatable to support the container in position to be engaged by the plunger to discharge product from the container by extrusion from the container, wherein the drive means comprises a linear actuator by which the plunger is movable in a dispensing direction at a relatively constant velocity, the apparatus further comprising control means arranged to detect said movement and to control the operation of the drive means in accordance with said movement.

The linear actuator is conveniently of the form comprising an electric motor and a coupling arranged to convert rotary motion of the motor into a linear motion of the plunger, for example through a worm and worm wheel.

Conveniently, the control means detects the rate of movement of the plunger during dispensing and provides a signal according to said rate of movement whereby to provide an indication of the operative state of the apparatus. In one arrangement the control means provides a signal which is a measurement of the movement of the plunger over unit time and compares such movement with a predetermined rate of movement to indicate the operative state of the apparatus, the signal being usable to interrupt operation of the plunger.

The control means may include means for detecting the power used by the electric motor which is a measure of the resistance to movement of the plunger.

In some cases the apparatus is arranged to detect when the resistance to the movement exceeds a predetermined amount, or amounts, and the control means interrupts the operation of the drive means, for example when the hardness of the product is too high, or when the plunger has completed a dispensing movement and engages an abutment. Additionally or alternatively there is detected when the resistance to movement is too low, for example when the product being dispensed is too soft. In each case the control means may interrupt the operation, or signal such information to the operator. Such information may be stored electronically or by other means to assist operational efficiency, product control and after sales service. Such information may be transmitted by modem to a control centre or the information may be obtained upon request from such remote locations.

If the product is too hard, or if the plunger has completed its dispensing movement, control means may instruct the drive to the plunger to be reversed and the plunger returned to its initial position.

The control means may also display resistance to operation and to indicate whether the resistance is too low and/or too high. Further means may indicate whether a container is on the support before, or at the end of, an operative movement of the plunger.

According to another aspect the invention provides dispensing apparatus for dispensing viscous product from a container of product, which apparatus comprises drive means, a plunger operated by the drive means to move reciprocally in a dispensing and a return direction, a support for the container in a dispensing position to support the container in position to be engaged by the plunger to discharge product from the container by extrusion, wherein the drive means is movable between a dispensing position in which the plunger is aligned with said support and a return position in which the plunger is displaced to one side of the support upon withdrawal away from the dispensing position.

Preferably the drive means is a linear actuator having a longitudinal axis and said axis is moved between said dispensing and return positions.

Preferably the drive means is pivotable about an axis, which axis is located towards the end of the drive means remote from said plunger.

Conveniently the drive means is moved between said dispensing and return positions by the plunger, or a part thereof, being guided along a cam track extending to one side or both sides of the support.

The plunger in moving from a dispensing position is conveniently arranged to pick up an empty container from said support and carry it to a position displaced to one side of the support for discharge from the plunger. The support may then be exposed for receiving a full container on to the support for a dispensing operation.

Picking up of empty containers from the support may be by the plunger being a close fit in the container when discharged, by applying vacuum between the plunger and the container, or by any other convenient means.

The empty container may be discharged from the plunger by engagement of the container with discharge means during withdrawal of the plunger towards said return position. Discharge means may be a mechanical stripping guide, compressed air blast, or other means.

The container is preferably of the kind which, when ready for a dispensing operation, encloses the product, except for an outlet opening, and has a deformable portion which is engaged by the plunger to reduce the internal volume of the container and cause product in the container to be extruded from the outlet opening. If product in such container is too soft it may be too readily dischargeable and may flow out of the container or otherwise not be dispensed correctly. If the product is too hard it may not be readily discharged from the container. It is also desirable that a relatively constant rate of discharge of product from the container is achieved, irrespective of the product hardness. However when the plunger is moving away from a dispensing position the drive may be at a higher speed to obtain a lower cycle time.

Different dispensing speeds can also be achieved by altering the power supply to the motor, usually by changing the voltage.

Figure 2:
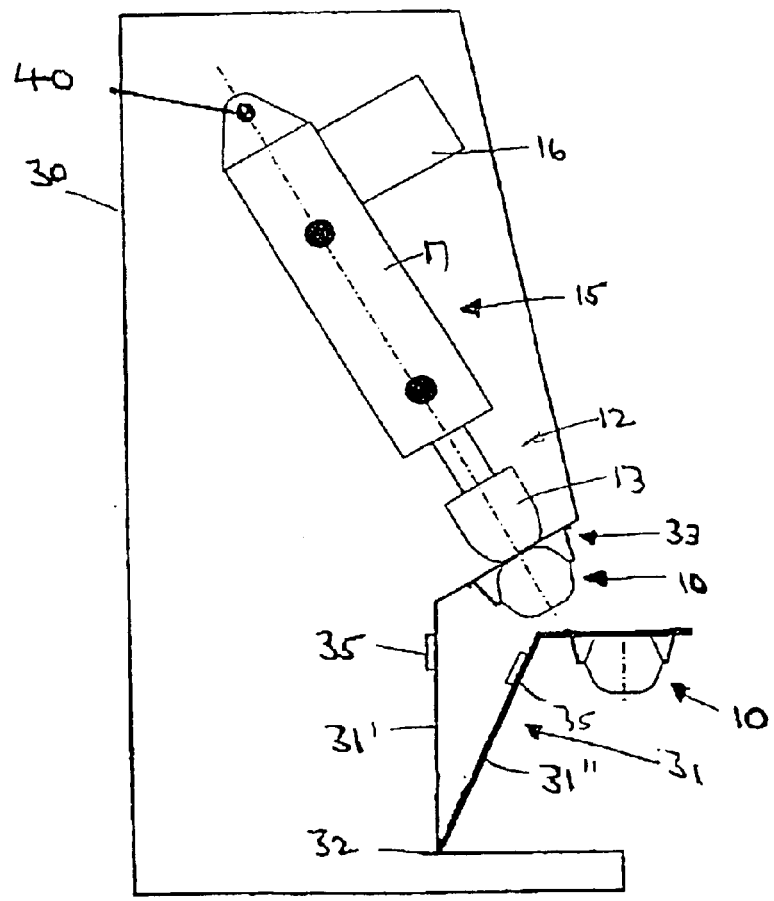
Figure 3:
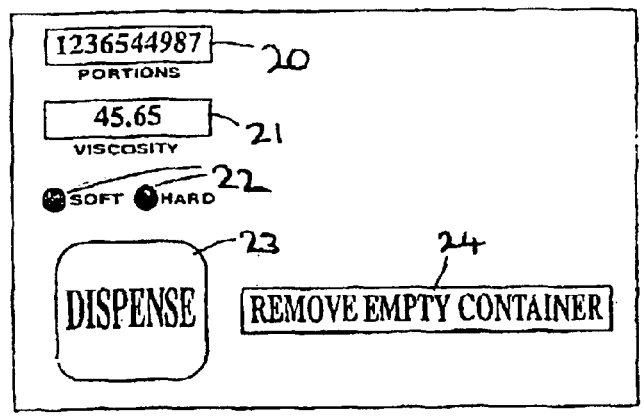
Figure 4:
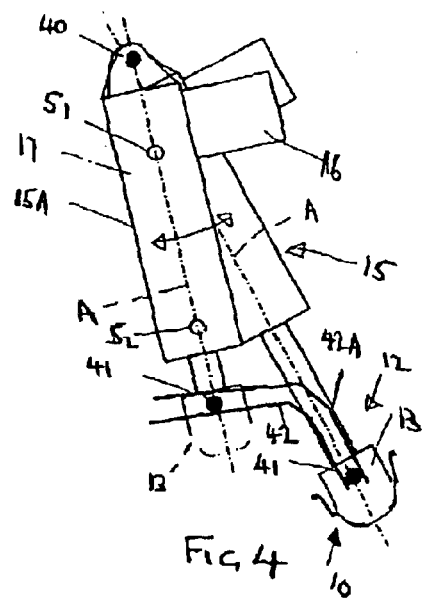
Figure 5:
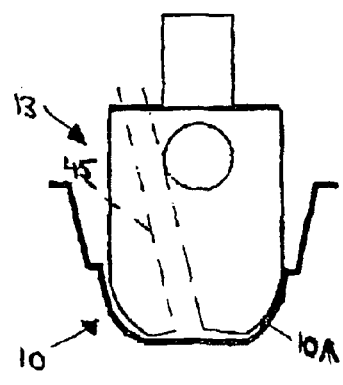
Figure 6:
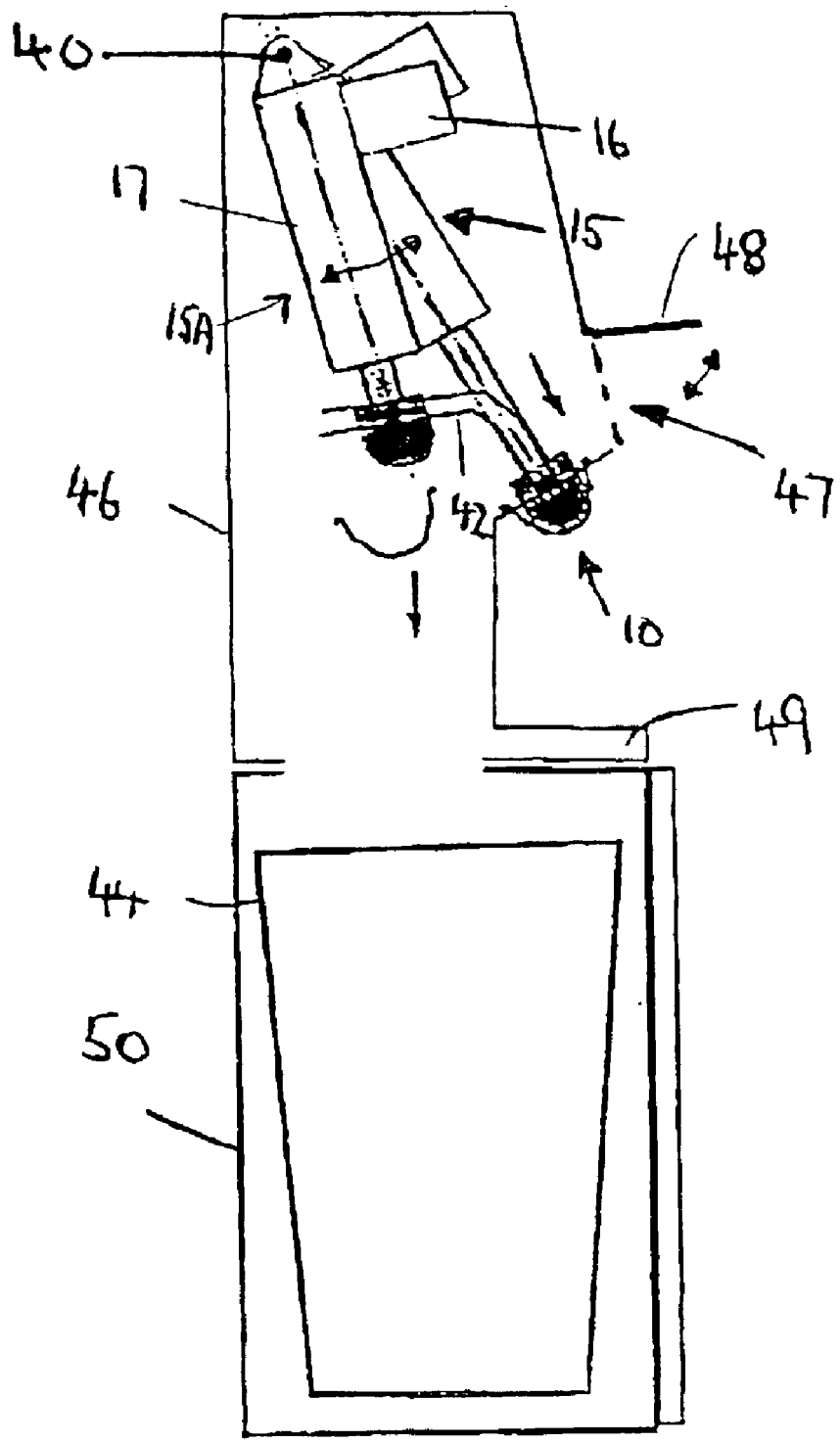

Further features of the invention will appear from the following description of embodiments of the invention given by way of example only and with reference to the drawings, in which:

FIG. 1A is a schematic side elevation, partly in section, of part of a dispensing apparatus according to the invention, at the commencement of a dispensing operation, FIG. 1B is a view corresponding to FIG. 1A at an intermediate stage during dispensing, FIG. 1C is a view corresponding to FIGS. 1A and 1B at the end of a dispensing operation;

FIG. 2 is a side elevation corresponding to FIGS. 1A, B and C showing the apparatus in more detail, including a support for the container of product, FIG. 3 is a view of a display for use with the apparatus, FIG. 4 is a schematic side elevation of a second embodiment of dispensing apparatus, FIG. 5 is a schematic side elevation of a plunger for the apparatus of FIG. 4, FIG. 6 is a schematic side elevation of apparatus incorporating the embodiment of FIG. 4

Figure 10:
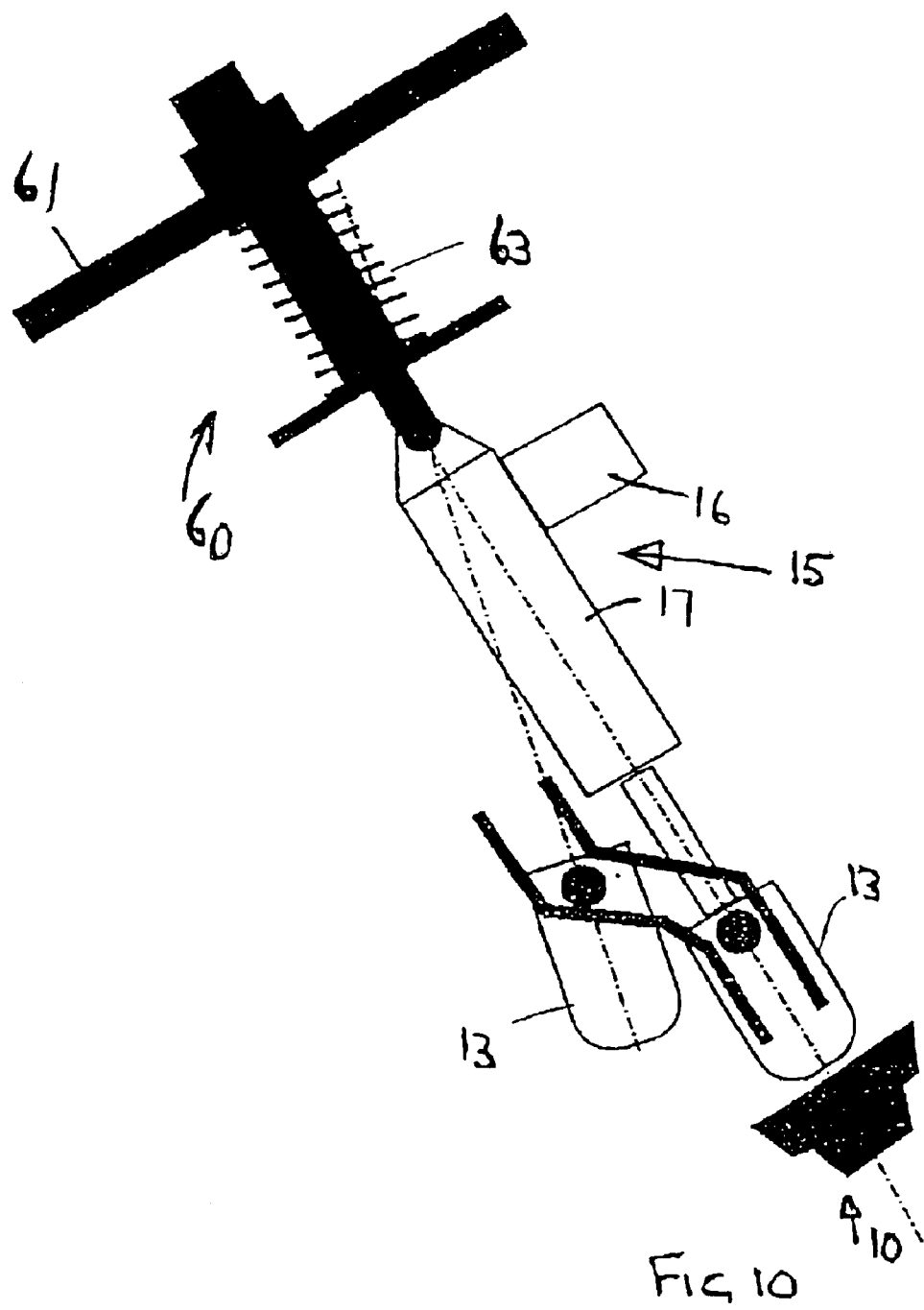
Figure 11:
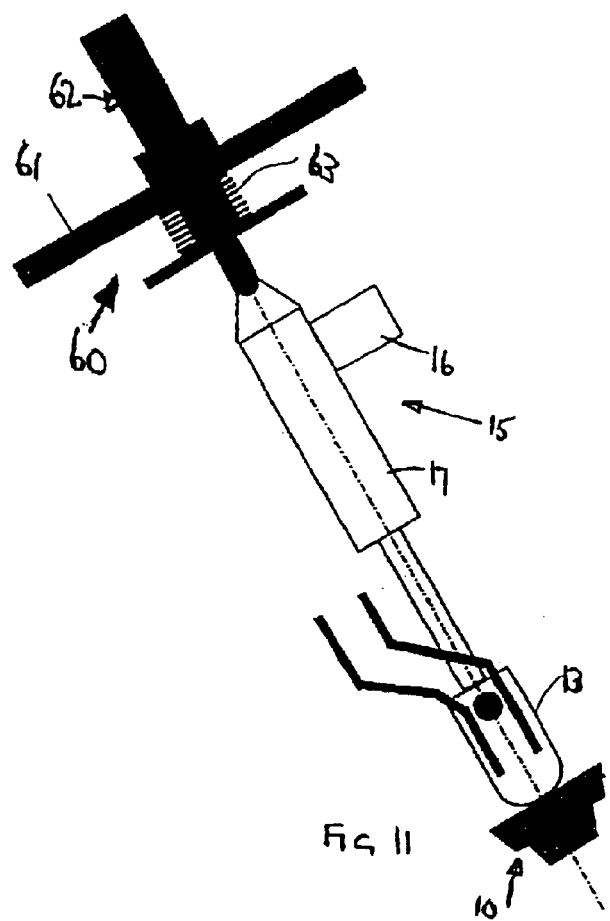
Figure 12:
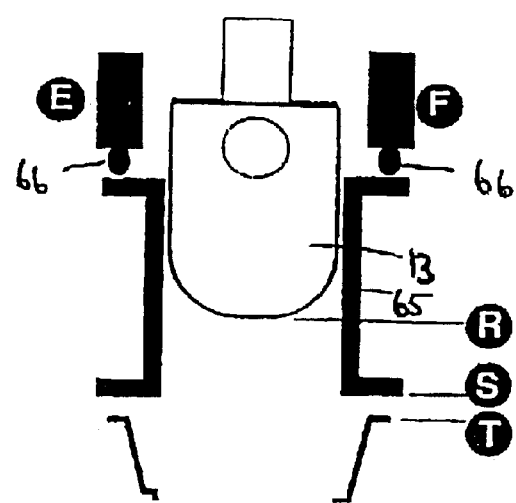
Figure 13:
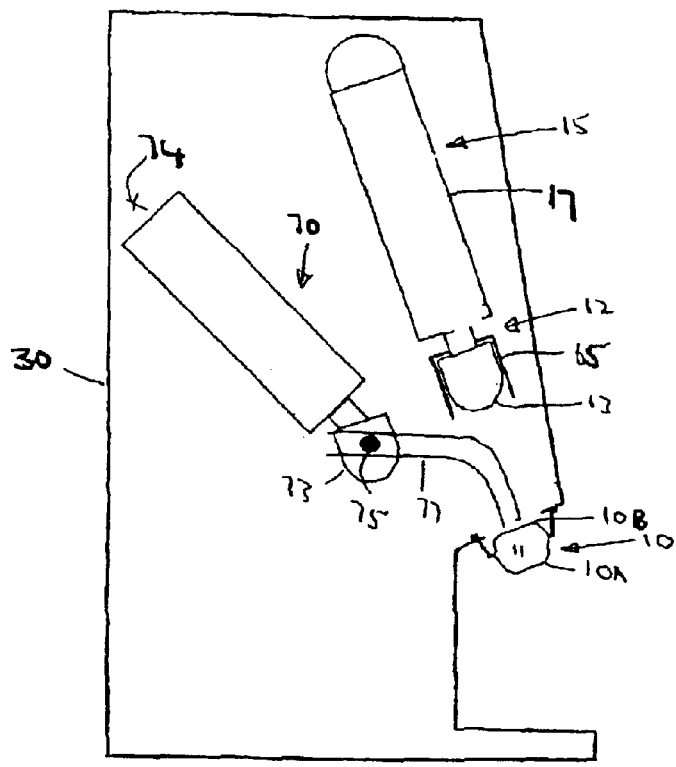
Figure 14:
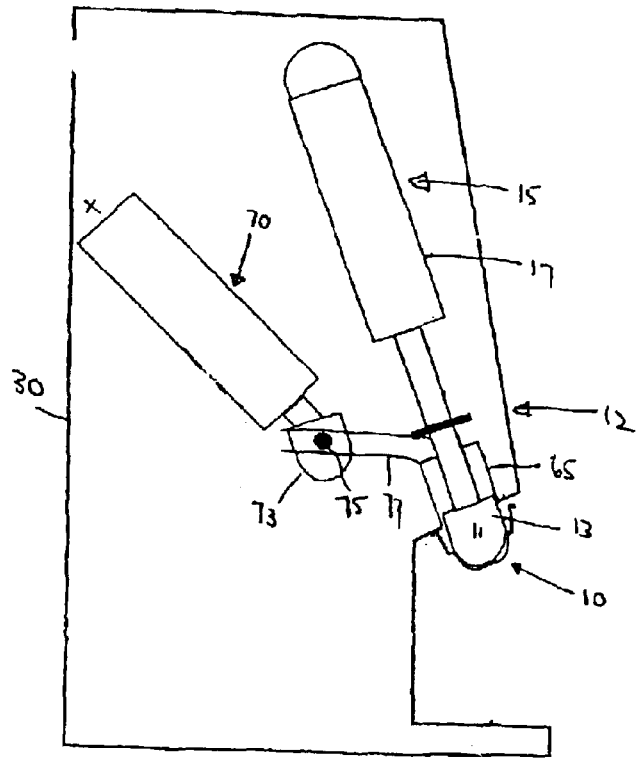
Figure 15:
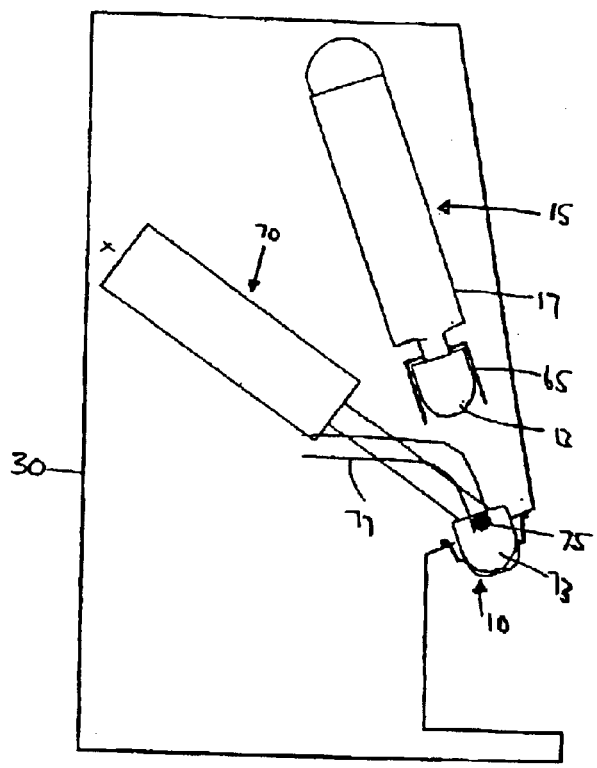
Figure 16:
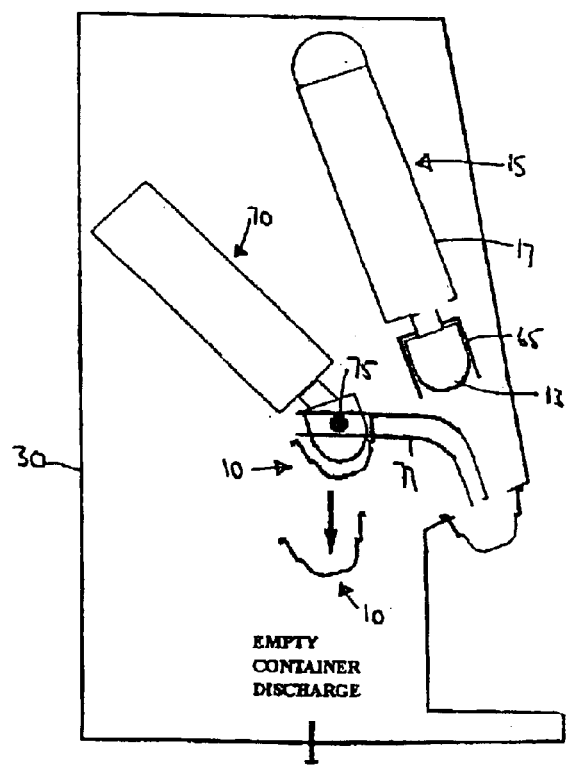

FIG. 7 is a schematic cross-section of another form of plunger for the apparatus, in one position, FIG. 8 corresponds to FIG. 7 showing the plunger in another position, FIG. 9 shows a side view of the plunger of FIGS. 7 and 8, FIG. 10 shows another arrangement, in side view, of a drive arrangement, in one position, FIG. 11 shows the arrangement of FIG. 10 in another position, FIG. 12 is a schematic side view of another arrangement of plunger for the apparatus of the invention, FIG. 13 is a schematic side elevation of a further embodiment of the invention in an inoperative position, and FIGS. 14, 15 and 16 are views corresponding to FIG. 13 in a dispensing position, a container pick up position, and a container discharge position, respectively.

Referring to the drawings and firstly to FIGS. 1–3 there is shown dispensing apparatus for dispensing product, for example frozen dessert, from individual containers 10 which may be of the kind shown and described in PCT patent specification WO96/01224. Such containers 10 are of closed construction having a base portion 10A and a deformable portion 10B between which the product 11 is contained. In the centre of the base portion 10A is formed an outlet opening (not shown) through which the product is to be discharged from the container 10. The deformable portion 10B is arranged to be deformed towards portion 10A to reduce the internal volume of the container thereby causing the product 11 to be extruded from the outlet which has a cross section smaller than that of the container.

Deformation of the portion 10B is achieved by a plunger 12 having a head portion 13 which, on movement of the plunger 12 in a product discharge movement, engages the deformable portion 10B of the container and urges it towards the base portion 10A.

The plunger 12 forms part of a drive mechanism 15 which, in this case, is a linear drive having an electric drive motor 16 which drives a worm and worm wheel located within a housing 17, the worm being drivingly connected to the plunger 12. Operation of the motor 16 is reversible so as the achieve a reciprocal movement of the plunger 12 in a dispensing direction in which the plunger 12 is extended from the housing 17 and a return direction in which the plunger 12 is drawn back into the housing 17. However the linear drive may take other forms each including an electrically operated drive motor whose rotational movement is translated into a linear motion.

It will be appreciated that since the motor 16 is arranged to rotate at a selected substantially constant speed or speeds the plunger 12 also moves at a constant speed corresponding to the speed of the motor 16. However the driving force on the plunger 12 can vary, during an operative movement, before and after a dispensing movement, and during dispensing, according to the resistance to movement due to the hardness of product 11 within the container 10, whilst still maintaining a substantially constant rate of movement of the plunger.

It will be evident that when there is a demand for high power of the linear drive this is accommodated by an increase in the power required of the motor 16. Since the power supplied to the motor 16 is generally of constant voltage the amount of amperage supplied to the motor will vary according to the power requirement.

Control means is provided for operating the linear drive 15 and the control means detects the amperage taken by the motor 16. In practice a constant power supply system may be supplied to the motor 16 which means that no matter what the input voltage or frequency, the constant power supply will adjust the power output to suit the requirements of the linear actuator. A DC motor is preferred at a constant power supply but a AC motor may also be used.

At a constant rate of movement of the plunger 12 the plunger 12 moves at a fixed distance per unit time no matter what the hardness of the product 11 within the container, subject to a maximum predetermined limit on the linear actuator power. This means that a container 11 holding product which is too soft for other drive systems can still be dispensed from the container 10 especially if the product has sufficient viscosity to support itself after dispensing.

However in practice the speed of the motor may vary if the resistance to movement changes significantly, for example, of the order of about 10% of the selected speed. To counter this effect, if required, the voltage level to the motor may be increased to compensate for an increased load and maintain the same operating speed.

The linear actuator can also handle harder product than hitherto since the power input to the linear actuator can be selected for this purpose and this has no effect on the requirements for a softer product. Hence the range of product which can be dispensed is increased. Nevertheless product in the container 10 may be too hard for dispensing, for example because of too low a temperature, incorrect formulation of product, icing up of the product in the container or a variety of other reasons. In order to avoid damaging the apparatus and for information purposes the control means will enable the apparatus to avoid an attempt to dispense product which is too hard. For example if the amperage supplied to the motor 16 is too high, i.e. above a predetermined limit, the control means may be arranged to interrupt operation of the motor. One arrangement is for the control means to be programmed to indicate too high an amperage reading and to interrupt operation of the drive means. The motor can then be arranged to reverse to its initial position upon receipt of a signal to the control means of an excessive amperage or current being reached.

However it may be that product which is too hard at one dispensing speed can be discharged at another slower speed in which case the dispensing speed may be reduced to dispense at that slower speed automatically or by the operator selecting the slower speed.

Similarly the control means can be arranged to detect when the amperage of the drive motor is too low and the product is too soft. In this case the plunger movement may not be reversed but may continue a dispensing operation but the control means indicates to the user that the product is too soft. If the product is detected as too soft the dispensing speed can be slowed down.

In one arrangement the control means is arranged to detect the rate of movement of the plunger and whether the plunger, during a dispensing operation, moves within a predetermined range of distance over a predetermined time. If such movement is outside said predetermined range a signal will be generated to show a fault in operation. This may be due to the product being too hard. The signal alerts the operator and may be used to interrupt operation of the plunger and, in some cases, to return the plunger towards it start position. Movement of the plunger can also be halted if there is a power demand on the plunger exceeding a predetermined amount, for example, due to product being too hard, the plunger movement being obstructed, the plunger reaching the container empty position, or for other reasons. The signal generated can activate visual or audible indicating means. For example a series of voice chips may be used.

In addition the control means can count the number of dispensing operations of the apparatus together with the occasions on which the product is too soft or is too hard, and the number of other malfunctions.

Referring in particular to FIG. 3 the control means may be linked to the illustrated indicator panel on which may be indicated at 20 the number of dispensing operations, at 21 the viscosity of the product being dispensed, at 22 whether the product it too soft or too hard, at 23 whether the apparatus is ready for a dispensing operation, and at 24 there may be an indicator instructing the operator to remove a container from the apparatus after dispensing, this being necessary for a further container to be located to dispense product.

Referring in particular to FIG. 2 the drive means and container of FIGS. 1A, 1B and 1C are located in a housing 30 with the axis of the drive means 15, plunger 12 and container 10 lying along an axis A which is inclined to the vertical. The axis A can, however, be vertical. The container 10 is mounted on a support arm 31 which is hinged at 32 to pivot between an operative position 31 and an inoperative position 31, in the latter position the container 10 being removable from the support arm 31. In the operative position of the arm 31 the container is located in the path of movement of the plunger 12 for engagement by the plunger and a dispensing operation. The support for the container may be in the form of a seating 33 shaped according to the base 10A of the container to support the base but leaving an opening coinciding with the outlet from the container. The support 33 acts as an abutment to counter the action of the plunger 12 during a discharge operation. The pivot or hinge 32 can be at any position above that shown.

Normally the product discharged from the container 10 is received in a cone or other container (not shown) beneath the outlet opening.

The control means may also include means for detecting the temperature of product in the container by providing on the head 13 of the plunger 12, or in the container housing, a temperature probe, for example an infrared probe, so that when the head 13 contacts the container during a dispensing operation it gives a temperature reading. This may be compared with the viscosity reading obtained as previously described. By the combination of a temperature and viscosity reading information is available to determine the status of the apparatus and to analyse any problems. For example re-frozen product may partially turn into solid ice which has a high viscosity and cannot be dispensed.

A product viscosity reading can be obtained at the beginning of the dispensing operation, possibly after a preset time of, say, five seconds after the dispensing operation has been commenced.

It is sometimes difficult to detect when all the product from the container has been dispensed by the use of a proximity switch or other position detecting means. For this purpose the control means may be arranged to detect when dispensing has been completed since the resistance to the movement of the plunger 12 will be high when the container is fully emptied, the support 33 acting as an abutment. Thus the control means may be arranged to cease a dispensing operation when the resistance to movement of the plunger exceeds a predetermined amount. However a position detector may be provided for this purpose.

It is also possible to use the apparatus to dispense part of the container contents or to dispense containers of different sizes and product volume. In such an arrangement the container may be of a different size, preferably of the same or similar diameter but a different depth, in which case the plunger will move a different distance depending on the container size. The control means may be pre-programmed to select a movement for different containers or different sizes. The operator may be able to select a different plunger movement or there may be a control arrangement operated according to the amperage detected in the drive motor. For example if a partially empty container is placed in the apparatus product dispensing may be detected and the dispensing movement adjusted accordingly. Partial discharge of containers to give two or more servings is possible by programming movement of the plunger to give preselected movements.

Operation of the dispensing apparatus involves the following steps:

1. The container 10 is placed onto the container holder 33 with the arm 31 in position 31.
2. The arm 31 is moved to position 31' with the container lying on the axis A.
3. The arm 31 may be latched in the dispensing position by a magnet, and a motorised or solenoid lock, operated by a mechanical or other switch, may lock the arm 31 in the dispensing position. A magnet pair 35 is shown in FIG. 2.
4. Provided that the apparatus detects that there is a container 10 in position when the arm 31 is in the dispensing position 31' then the dispense indicator 23 will light up to indicate that the machine is ready for dispensing and the dispensing button may be pressed.
5. Once the dispensing button is operated the linear actuator motor 16 commences operation and the plunger 12 moves downwards and dispenses product from the container 10. Once the product has been dispensed the linear actuator retracts the plunger 12 and the arm 31 is ready to be opened to position 31" or it may be arranged to open automatically under gravity or by the use of a small linear driver.
6. When the plunger 12 has returned fully to its uppermost position the indicator 24 on the panel is actuated to indicate a sign showing that the empty container should be removed.
7. As previously mentioned the panel of FIG. 3 may be fitted with a counter which will record the number of discharge operations of the apparatus. The counter may be arranged to exclude operations which have failed due, for example, to the product being too hard. However the counter may record all attempted dispensing operations.
8. It is envisaged that a dispensing speed control indicator be incorporated in the control means which will enable voltage adjustment to be provided to control the voltage to the DC motor. Alternatively there may be provided controls which would allow different speeds of dispensing which can be selected by the operator.

Referring now to FIGS. 4–6 there is shown another form of dispensing apparatus, similar to the previously described embodiment, and in which the same reference numbers are used for similar parts.

A linear drive 15 is again employed having a central longitudinal axis A and in this case the axis A is aligned with the container 10 during a dispensing operation but the actuator 15 is movable about a pivot axis 40 located at is end remote from the plunger 13. This is achieved by the plunger carrying transversely extending pins 41 to each side of the plunger which are each guided for movement along a cam track 42. The cam track 42 lies parallel to the axis A over its lower region 42A and above the region 42A the cam track is displaced from said axis A towards one side of the container position 10. It will be seen that the linear actuator will, as the plunger 13 moves upwards following a dispensing operation, cause the plunger 13 to move along the track 42 and the linear actuator 15 has its axis A displaced from its previous dispensing position by pivoting about the axis 40 so that when the plunger 13 is at its most elevated position the linear actuator 15 assumes the position shown at 15 A in FIG. 4. In this position the plunger 13 lies to one side of its dispensing position and, as can be seen from FIG. 6, it lies above a container 44 in which empty containers 10 are to be discarded.

In order to achieve disposal of empty containers 10 after a dispensing operation to discharge the container contents, the plunger 13 picks up the container 10 from its support and carries the container until the linear actuator 15 reaches position 15 A. Such picking up of the container may be achieved in several ways, see FIG. 5. The plunger 13 may, after fully discharging the contents of the container be a close fit within the base part 10A of the container. Additionally or alternatively a vacuum may be applied between the base of the plunger 13 and the container base 10A through a vacuum duct 45. As a further alternative the plunger 13 may be of resilient material towards its lower end whereby it can enter the container by flexing inwards whilst gripping the container at the same time.

The container is stripped from the plunger 13 as the actuator reaches position 15 A by engagement of the container with a stripper bar (not shown) located in the path of the container as it moves from the dispensing position to the discharge position. Other means of container removal may be used including air blast through the plunger.

Referring now particularly to FIG. 6 there is shown the apparatus of FIG. 4 located within a housing 46 so that the upper end of the linear actuator is supported about the pivot 40 situated towards the upper end of the housing 46. The housing 46 encloses the apparatus but is provided with an access opening 47 closable by flap 48 whereby upon raising the flap 48 access through the opening 47 may be achieved. The flap may be kept closed by, for example an electromagnet, until the actuator is in the up position and may be automatically opened at the appropriate time.

With the flap 48 in the open position and with the plunger 13 displaced to one side of the container support a new filled container may be placed on the support prior to the plunger 13 being extended from the linear actuator 15. With a fresh filled container 10 in position on the support the actuator 15 is energised to extend the plunger in a dispensing direction thereby causing the plunger to move along the cam track 42 until it is above the filled container and further movement along the axis A causes the plunger to engage the container and discharge the contents through the opening at the lower part of the container support. The operator locates a receiving vessel or cone below the container outlet to receive the product from the container.

Below the support is located a drip tray 49 for catching any product which does not enter the receiving vessel.

Below the housing 46 is a base unit 50 on which the housing 46 is supported and the base unit contains, removably, the bin 44 for empty containers. An empty container chute may be fitted for guiding the released empty containers from the plunger into the discharge bin. This chute is removable for cleaning if required. The chute can also be designed to direct empty containers out the side or back of the dispenser for countertop applications. A further alternative is to fit a nesting tube below the discharge point of the empty containers for nesting together such containers for minimum space requirements of the containers.

At two positions spaced apart along the axis A the linear actuator 15 carries proximity switches 51 and 52, the switch 51 determining the uppermost position of the linear actuator and the position 52 determining the lowermost position.

There has previously been described an arrangement by which the force required to drive the plunger has been detected electrically so as to prevent the drive from trying to discharge product which is too hard and/or to determine when the plunger has fully discharged the container. Instead of electrical overload protection means, as described, a mechanical arrangement can be employed such as shown in FIGS. 7–11.

In the arrangement of FIGS. 1–4 the plunger 13 is formed as an assembly including a plunger component 13A and a relatively movable plunger component 13B between which is located a compression spring 55. As seen in FIG. 9 the component 13B is attached to the component 13A through pins 56 mounted on the component 13A and extending outwardly through slots 57 formed in the component 13B whereby the component 13B can be moved relative to the component 13A against the action of the spring 55. The spring 55 would normally be in an extended condition, as shown in FIG. 7, but when the force on the plunger exceeds a predetermined value then the spring 55 is compressed to the position shown in FIG. 8. In this case the component 13 B, which is the part engaging with the container, fails to reach a discharge position and discharge of the container is not achieved. This will occur when the resistance to movement of the plunger exceeds a predetermined value. The position of the component 13B can be detected by a position probe 58 which detects that the component has not moved to a container discharge position, and signals to the operator.

Referring now to FIGS. 10 and 11 an alternative mechanical pressure detector is shown. In this arrangement the upper end of the linear actuator 15 is carried, pivotally, on an assembly 60 which is located with a fixed plate 61 mounted on the housing and a telescopically movable member 62, movable in relation to the fixed plate 61. Located between the movable and fixed members 62, 61 there is provided a spring 63 which compresses under a predetermined axial load arranged to be such that it detects when the product within the container 10 is too hard. Under such circumstances the spring 63 is compressed, as shown in FIG. 11, and the product cannot be dispensed from the container.

All of the mechanical devices described above can include limit switches or other detection devices to indicate too hard or too soft situations. This information can be transmitted to the control of the dispenser to carry out similar functions to those already described above.

Referring now to FIG. 12 there is shown an arrangement by which a failure to remove an empty container from the support is detected. A shroud 65 is arranged around the plunger 13 as it passes from a return position towards a dispensing position. The shroud 65 is sized so that as the shroud 65 is lowered towards the container support it will engage a duplicate container if it has been placed on top of an empty container. In its normal mode the shroud 65 will contact a container on the support in a lower position. Thus in this mode the lower end of the shroud 65 is arranged so that at its lower end it is located within a short distance of the upper end of the container. Limit switches 66 detect the position of the upper end of the shroud and if these limit switches are actuated prior to the limit switches detecting movement of the linear actuator 15 then the system will generate a signal indicating that there is a new container which has been loaded inside an empty container which has not been removed. The location of the lower end of the plunger 13 in relation to the lower end of the shroud is arranged to avoid any possibility that the operator has fingers in the wrong position. It will also be appreciated that the presence of an obstruction will be detected due to the drive force on the linear actuator being greater than should be the case. The shroud 65 also serves the function of compressing the lid of the container 10 onto the base 10A by engaging the edges of the lid where they are located onto the base.

An amperage detecting circuit can be installed to ensure that if, before dispensing is intended to commence, the drive amperage exceeds a preset maximum, then the linear actuator will be instructed either to stop or return upwards to its starting position.

FIGS. 13–16 show an alternative arrangement by which containers are removed from the apparatus after discharge of contents from containers.

In this arrangement the apparatus is similar to that of FIGS. 1A–1C and the same reference numbers are used for similar parts. In this case, however, as well as the linear drive 15 for dispensing products from the containers 10, there is provided a further linear or other drive 70 which is for picking up and removing the containers from their seating, after discharge. The drive 15 is mounted with its housing fixed to the housing 30 of the apparatus so that the plunger 13 moves reciprocally of the central axis of the drive 15 to make a discharge and return movement. In FIG. 13 the plunger 13 is in its retracted position prior to a discharge movement.

In FIG. 14 the plunger 13 has moved to a discharge position in which the container contents are extruded from the container 10, in the manner described previously.

The plunger 13 returns towards its initial position and the drive 70 operates its associated pick up plunger 73 which moves to pick up and discharge the empty containers. The axis of the drive 70 and plunger 73 is inclined to the vertical and inclined to the axis of drive 15, and is supported for pivotal movement about a pivot 74 to change the orientation of the axis of the drive 70.

The plunger 73 has lateral extensions 75 which are located in and guided by cam tracks 77 located to each side of the plunger 73 so that as the plunger is extended it passes along the track or guide defined by the cam tracks 72.

Towards the end of the plunger movement (FIG. 15) the plunger 73 reaches the empty container 10 and the plunger enters the container to become attached thereto by frictional engagement, by vacuum (as described), or by other means. Upon retraction of the plunger 73 the container 10 moves with the plunger away from its seating and to one side of the path of the discharge plunger 13. The container carried by the plunger 73 is then dislodged from such plunger by release of vacuum, by engagement with a fixed stripping member (not shown), or otherwise, so that the container is released from and falls under gravity from the plunger 73 into a receptacle.

In other respects the apparatus of FIGS. 13–16 operates as described previously and the linear drive 15 operates in the manner described. The drive 70, in providing a simpler function than the drive 15 may be constructed to move the plunger 73 reciprocally at a constant speed in each direction, the speed being sufficient to effect speedy removal of the containers after discharge.

It will be appreciated that the plunger speed can be changed so that the plunger 13 travels in its reciprocating motion at faster speeds when it is not discharging product from the container, the speed slowing down when the driving force needs to be increased during discharge. Thus on a discharge movement the plunger may descend from its return position to a position at which product discharge is to commence, at a faster speed. The plunger speed is then slowed during discharge. Upon completing product discharge the plunger may move to its return position at a faster speed. This gives rise to improvements in cycle time and can be readily achieved by detecting the position of the linear actuator and altering the speed ratios over the relevant portions of the travel.

A portable battery pack may be installed externally or internally to the dispenser to supply a DC supply for remote operation.

What is claimed is:

1. Dispensing apparatus for dispensing viscous product from a container of product, comprising drive means, a plunger operated by the drive means to move reciprocally in a dispensing and a return direction, a support for the container locatable to support the container in position to be engaged by the plunger to discharge product from the container by extrusion from the container, wherein the drive means comprises a linear actuator by which the plunger is moveable in a dispensing direction at a velocity which remains substantially constant, the apparatus further comprising control means arranged to detect said movement and to control the operation of the drive means in accordance with said movement.

2. Dispensing apparatus according to claim 1 wherein the linear actuator is in the form comprising an electric motor and a coupling arranged to convert rotary motion of the motor into a linear motion of the plunger.

3. Dispensing apparatus according to claim 2 wherein the control means includes detection means for detecting the power used by the electric motor as a measure of the resistance to movement of the plunger.

4. Dispensing apparatus according to claim 1, wherein the control means detects the rate of movement of the plunger during dispensing and provides a signal according to said rate of movement whereby to provide an indication of the operative state of the apparatus.

5. Dispensing apparatus according to claim 4 wherein the control means provides a signal which is a measurement of the movement of the plunger over unit time and compares such movement with a predetermined rate of movement to indicate the operative state of the apparatus, the signal being usable to interrupt operation of the plunger.

6. Dispensing apparatus according to claim 1 wherein the apparatus is arranged to detect when the resistance to movement of the plunger exceeds a predetermined amount, or amounts, and the control means interrupts or changes the operation of the drive means accordingly.

7. Dispensing apparatus according to claim 6 wherein the linear actuator is mounted on a fixed member through a spring, compression of the spring beyond a predetermined axial load detecting when product is too hard.

8. Dispensing apparatus according to claim 6 wherein the end of the linear actuator remote from the plunger is connected to a spring which is in turn connected to a fixed member, whereby upon operation of the linear actuator to disperse product from the container a force to tend to compress the spring is applied, compression of the spring signaling operational parameters of the apparatus.

9. Dispensing apparatus according to claim 1 wherein detection means detects when the resistance to movement of the plunger is too low and provides a signal which may be used to interrupt or change the operation of the plunger or provide an indication to the operator.

10. Dispensing apparatus according to claim 1 wherein the drive means provides signals of each operation of the plunger which signals are collected and stored by the apparatus, or remotely.

11. Dispensing apparatus according to claim 1 wherein the control means upon detecting that the resistance to movement of the plunger exceeds a certain level causes the movement of the plunger to be reversed towards its initial position.

12. Dispensing apparatus according to claim 1 wherein the position of the plunger is detected and, if the plunger does not reach a predetermined position at which dispensing of product should commence, a signal is generated to indicate a malfunction, such as the presence of an empty container in addition to a container to be dispensed, and plunger movement is interrupted.

13. Dispensing apparatus according to claim 1 wherein the container is arranged to enclose product and has an outlet opening, a deformable portion of which is engaged by the plunger to reduce the internal volume of the container and cause product in the container to be extruded from the opening.

* * * * *